United States Patent Office 3,611,536
Patented Oct. 12, 1971

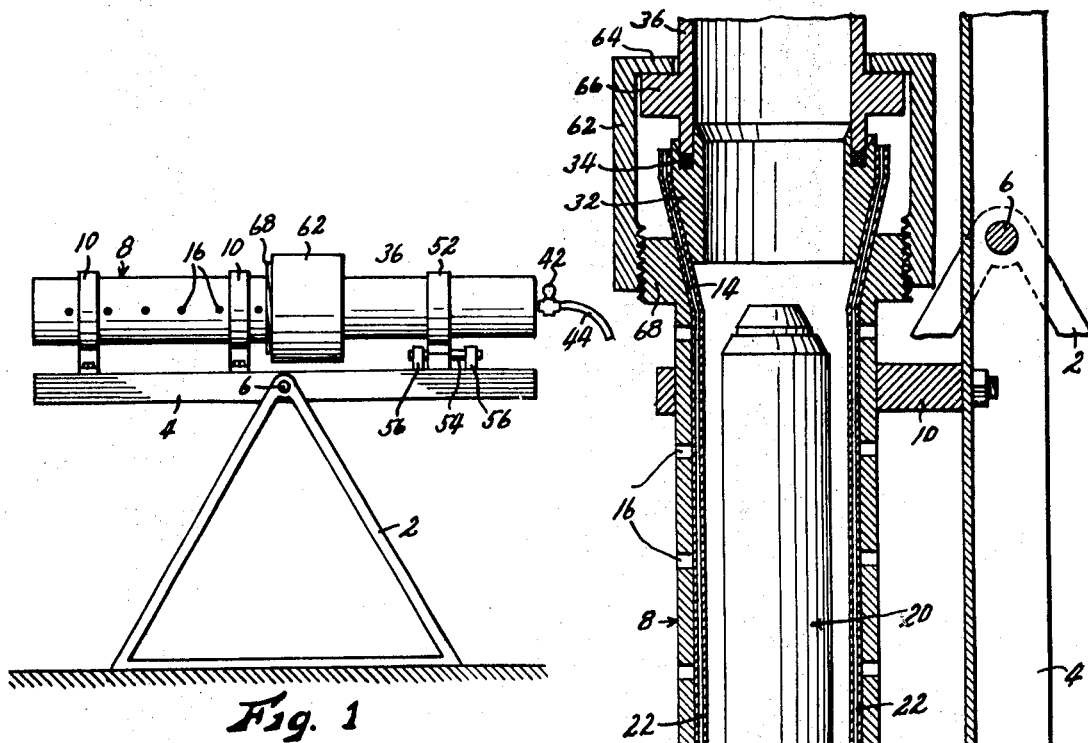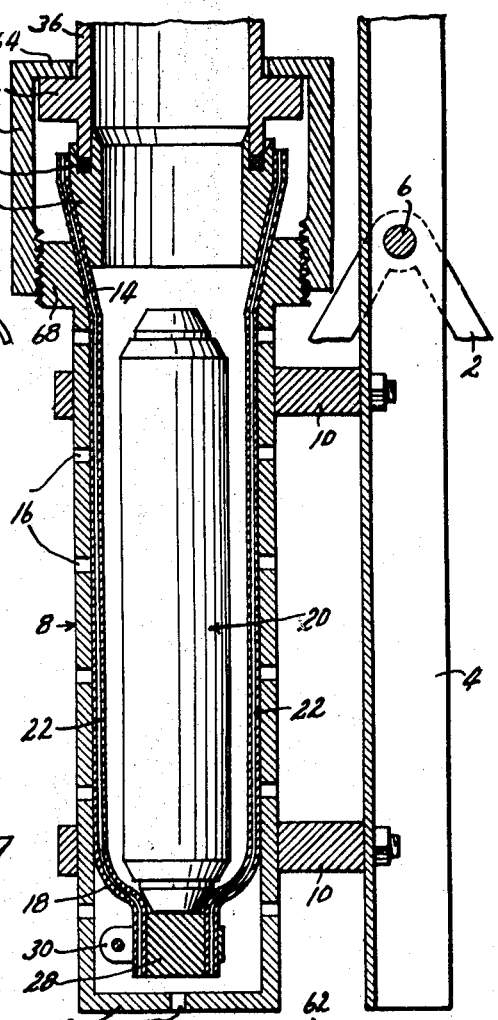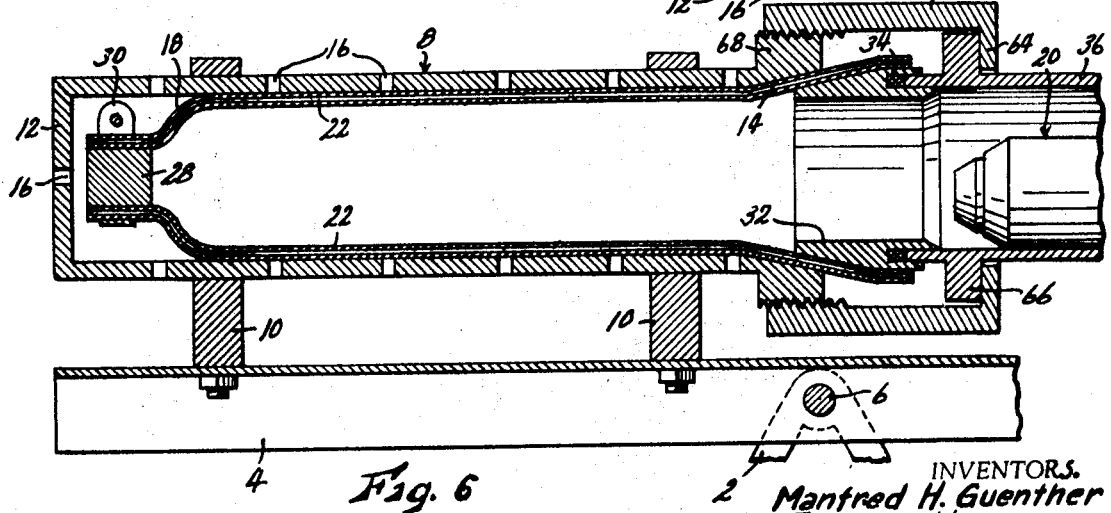

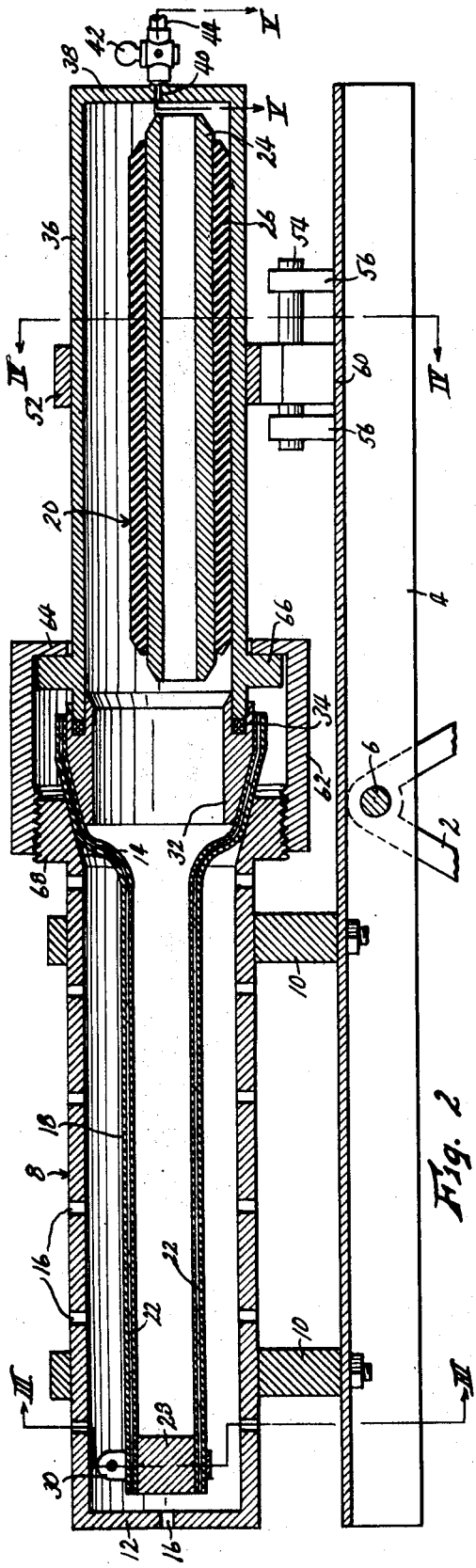
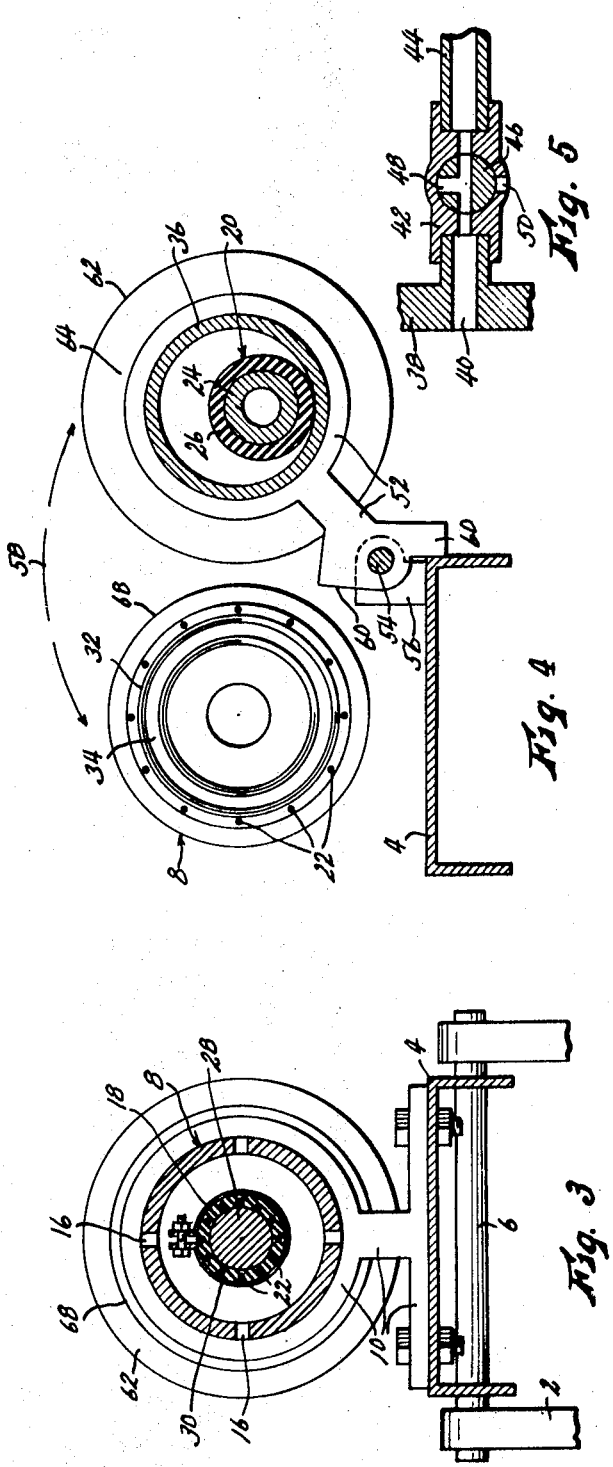

3,611,536
APPARATUS FOR APPLYING EXPANSIBLE SHEATHS TO CORES
Manfred H. Guenther, 6103 E. 151st Terrace, Grandview, Mo. 64030, and Eugene Hayes, Kansas City, Kans.; said Hayes assignor to said Guenther
Filed June 11, 1969, Ser. No. 832,277
Int. Cl. B23p 11/02, 19/00, 19/02
U.S. Cl. 29—200 B                                 5 Claims

ABSTRACT OF THE DISCLOSURE

An apparatus for applying a rubber or other resiliently expansible sheath to a core member, said sheath having a normal interior diameter less than the diameter of said core, said apparatus consisting of seals for closing the ends of said sheath, whereby air under pressure introduced therein will expand said sheath to an internal diameter greater than the core diameter, and mechanism for introducing said core into said sheath while the latter is so expanded whereby when said pressure is relieved said sheath will contract resiliently into snug engagement with said core.

---

This invention relates to new and useful improvements in apparatus for applying rubber facings to rollers and other core members. Such rubber-faced rollers have many uses, for example in applying glue to labels in labelling machines. Such rollers often become worn or out-of-round to such an extent that they are no longer capable of performing their function efficiently, and must be refaced. The primary object of the present invention is the provision of an apparatus for performing this refacing of such rollers rapidly, conveniently, and inexpensively, although the apparatus shown is equally effective in applying original or new facings.

Heretofore, rubber facings have commonly been applied to a roller core by fixing the core in a mold, injecting the rubber or rubber-like material into the mold to form it about the core, then removing the roller from the mold and grinding it accurately to the final diameter desired. For refacing worn rollers, the old facing may be utilized to some extent by first grinding it down to such a diameter that it can accept a new facing of suitable thickness, then inserting it in a mold and proceeding as before. In either case, it would obviously be desirable if the new facing could be applied from lengths of simple rubber hosing, such hosing being readily available in nearly any desired material, and with walls of accurately uniform thickness. However, for such hosing to be used successfully, it must fit on the core very tightly, and there has been no available apparatus for inserting a core accurately into a rubber sheath or hose of smaller diameter than itself, particularly a very long core.

The apparatus as contemplated by the present invention consists generally of a rigid pressure chamber operable to contain the core and to be connected in sealed, end-to-end relation with one end of said sheath, the opposite end of said sheath also being sealed. When the sheath has been expanded by air pressure admitted to the pressure chamber, said chamber and sheath may be tilted to a vertical position with the chamber uppermost, whereupon the core falls from the chamber into the sheath by gravity.

Other objects are simplicity and economy of structure, and efficiency and dependability of operation.

With these objects in view, as well as other objects which will appear in the course of the specification, reference will be had to the accompanying drawing wherein:

FIG. 1 is a side elevational view of an apparatus for applying expansible sheaths to cores embodying the present invention, FIG. 2 is a fragmentary enlarged vertical longitudinal sectional view of the apparatus shown in FIG. 1, with a core and sheath mounted operatively therein preparatory to application of the sheath to the core, FIG. 3 is a fragmentary sectional view taken on line III—III of FIG. 2, FIG. 4 is a sectional view taken on line IV—IV of FIG. 2, with the pressure and forming chambers moved out of coaxial alignment, FIG. 5 is an enlarged fragmentary sectional view taken on line V—V of FIG. 2, FIG. 6 is a fragmentary view similar to FIG. 2, showing the sheath expanded, and FIG. 7 is a view similar to FIG. 6 with the members tilted to drop the core into the sheath.

Like reference numerals apply to similar parts throughout the several views, and the numeral 2 applies to a floor stand, to the upper end of which an elongated frame 4 is pivoted on a horizontal pivot pin 6. Said frame may consist of a length of channel iron, pivoted on pin 6 at its midpoint, and may be pivoted from a horizontal position as shown in FIGS. 1, 2, and 6, to a vertical position as shown in FIG. 7. Disposed above the left end portion of frame 4, parallel thereto, is a forming chamber 8 rigidly affixed to frame 4 by brackets 10. Said forming chamber comprises a cylindrical tube closed at its outer end by end wall 12, and being open at its inner end, defining an outwardly divergent conical sealing surface 14 at its open end. Said forming chamber has perforations 16 distributed evenly in all walls thereof for the escape of air, and is adapted to have the core sheath 18, to be applied to a core 20, inserted axially into the open end thereof in unexpanded form.

Said sheath has the form of a simple tubular rubber hose, having a normal internal diameter less than the diameter of core 20. If necessary or desirable for reasons to be discussed below, said hose may be reinforced against longitudinal stretching by means of textile or other strands 22 molded longitudinally therein. Said strands do not, however, inhibit radial expansion of the hose. Core 20, as best shown in FIGS. 2 and 4, constitutes a steel mandrel 24 with a tubular rubber covering 26. The present apparatus may be used to apply a unitary rubber covering of the total desired thickness to mandrel 24. However, as shown, sheath 18 is illustrated as being applied to a core 20 having a portion of the old rubber covering still in place, said old covering having been ground down to a diameter such that it can accept the refacing provided by sheath 18 to be applied. This is an economy provision.

The end of sheath hose 18 adjacent end wall 12 is sealed by a plug 18 inserted therein and secured by an ordinary hose clamp 30. The opposite end of the sheath hose projects outwardly from the open end of forming chamber 8, and has an externally tapered tubular ferrule 32 inserted forcibly therein. The taper of said ferrule corresponds to the taper of seating surface 14 of the forming chamber, and the hose wall is compressed therebetween when the ferrule is forced toward the forming chamber as will be described. The outer end surface of ferrule 32 has a circular gasket 34 embedded therein. The internal diameter of ferrule 32 is such that core 20 can pass freely therethrough.

A pressure chamber 36, having the form of a rigid cylindrical tube, is mounted on the right end portion of frame 4, normally in coaxial alignment with forming chamber 8. Said pressure chamber is of a diameter and length to contain core 20 loosely therein. The end thereof toward forming chamber 8 is open, and of a diameter to engage gasket 34 of ferrule 32. The opposite end thereof is closed by an end wall 38 having a passageway 40 therethrough which is connected through a manually operable valve 42 to a flexible hose 44 from an air compressor, not shown but well understood in the art. As best shown in FIG. 5, valve 42 is provided with a manually rotatable plug 46 having a passageway 48 therein operable by rotation of said plug to interconnect the interior of chamber 36 selectively either with hose 44, or with an atmospheric vent 50. Chamber 36 is provided with a bracket 52 fixed thereto and extending radially therefrom, the outer end of said bracket being slidably and rotatably mounted on a shaft 54 extending parallel to the axis of the chamber and mounted in ears 56 affixed to frame 2. Thus chamber 36 may be moved parallel to its axis by the sliding of bracket 52 on shaft 54, and may be pivoted, as indicated by arrowed line 58 in FIG. 4, either to a position in coaxial relation with chamber 8, at which position a shoulder 60 of bracket 52 engages frame 4, or to a position in which the forming and pressure chambers are out of alignment, with their open ends exposed, as in FIG. 4, at which position an ear 60 of bracket 52 engages frame 4. Pressure chamber 36 is detachably connected to forming chamber 8 by means of a large union ring 62, said union ring being provided at one end with an internal flange 64 having rotatable sliding engagement with an external collar 66 fixed to chamber 36, and being internally threaded at its opposite end for engagement with an enlarged, externally threaded collar 68 fixed to chamber 8.

In operation, sheath hose 18 is first cut to the desired length, somewhat longer than the core 20 to which it is to be applied, plug 28 is inserted in one end thereof and secured by hose clamp 30, and its opposite end expanded and ferrule 32 inserted therein. The expansion of the sheath for insertion of ferrule 32 may require a special tool, particularly if the sheath has thick walls, but such tool forms no part of the present invention. Then, with pressure chamber 36 pivoted out of alignment with forming chamber 8, as in FIG. 4, sheath 18 is inserted into chamber 8, and core 20 is inserted into chamber 36. Said chambers may of course be of any desired length, depending on the length of the cores to which sheaths are to be applied. Pressure chamber 36 is then pivoted into coaxial alignment with forming chamber 8, and union ring 62 is engaged with collar 68 of chamber 8 and drawn tight. This moves chamber 36 toward chamber 8, as permitted by the sliding of bracket 52 and shaft 54, to press the open end of chamber 36 into sealing engagement with gasket 34, and to compress the sheath wall around its entire periphery, between ferrule 32 and seating surface 14. Sheath 18, ferrule 32 and chamber 36 then form a single composite chamber, completely sealed except for passageway 40 of chamber 36, controlled by valve 42.

Valve 42 is then manipulated to interconnect chamber 36 with pressure hose 44, whereby to admit air under pressure to chamber 36 and to the interior of sheath 18. Since the chambers are horizontally disposed at this time as shown in FIG. 2, and since there is ample space for air to pass around core 20 in chamber 36, core 20 is not moved by the entering air, but sheath 18 is radially expanded until it engages the interior surface of forming chamber 8 as shown in FIG. 6. Frame 4 is then tilted on pivot pin 6 to a vertical position with pressure chamber 36 uppermost, as shown in FIG. 7, whereupon core 20 falls through ferrule 32 into the expanded sheath 18 by gravity. Valve 42 is then manipulated to relieve the air pressure through vent 50, whereupon sheath 18 contracts resiliently into very tight contact with the core. By reversing the assembly process already described, the sheathed core may be removed from chamber 8, and the end portions of the sheath, those portions containing plug 28 and ferrule 32, are carefully trimmed away, and if necessary or desirable, the sheath may be ground to an accurate final diameter.

As sheath 18 is expanded in the process just described, forming chamber 8 serves to limit and control said expansion, preventing over-expansion which could permanently deform the sheath and impair its ability to contract tightly about the core when the internal air pressure is relieved, and also prevents localized "ballooning" of the sheath as it is inflated, which would also be injurious to the sheath. The perforations 16 of chamber 8 prevent the formation of "pockets" of pressurized air between the chamber walls and the sheath, which could inhibit the expansion of the sheath and prevent the core from falling freely into it.

As the sheath is expanded radially as described, it of course also has a tendency to be elongated longitudinally of its axis. The degree of this longitudinal stretching will be negligible if the sheath is reinforced by longitudinal strands 22 as shown, but may be substantial, perhaps as much as 50 percent but depending on the sheath material and proportions, if it is not longitudinally reinforced. In this case, the sheath should originally be cut to a shorter length to compensate for this longitudinal stretching. In no case should the stretched length of the sheath be greater than the length of chamber 8, since this would result in folding or convoluting thereof, so that the core could not enter it freely. Longitudinal reinforcement of the sheath is preferred, since if it is allowed to stretch as it is inflated, it will still be at least partially elongated when it is eventually contracted onto the core. This may result in a gradual slipping or "creeping" shortening of the sheath on the core during subsequent usage of the core in whatever function it may operate, especially if the core to which the sheath is applied is very smooth or polished so that the sheath cannot obtain a firm "non-slip" purchase therein. However, if the core is somewhat rough, so that the sheath can obtain a non-slip purchase thereon, the use of non-reinforced sheathing material is perfectly satisfactory.

While we have shown and described a specific embodiment of our apparatus, it will be readily apparent that many minor changes of structure and operation could be made without departing from the spirit of the invention.

What we claim as new and desire to protect by Letters Patent is:

1. An apparatus for applying a resiliently expansible tubular sheath to a core member, said sheath having a normal internal diameter less than the diameter of said core member, said apparauts comprising:
    (a) sealing means for closing the ends of said sheath against the egress of air therefrom,
    (b) means for admitting air under pressure through said sealing means to the interior of said sheath to expand said sheath to an internal diameter greater than the diameter of said core member,
    (c) a rigid perforated forming chamber positioned to enclose said sheath as it is expanded, whereby to limit and control the expansion thereof, and
    (d) operating means for inserting said core member into said sheath while the latter is so expanded.
2. An apparatus as recited in claim 1 wherein said sealing means comprises:
    (a) a plug operable to seal one end of said sheath,
    (b) a rigid pressure chamber large enough to contain said core member disposed adjacent the opposite end of said sheath, and
    (c) means for connecting said pressure chamber in sealed, intercommunicating relation with said opposite sheath end, said air under pressure being admissable to said pressure chamber.
3. An apparatus as recited in claim 2 wherein said operating means comprises:
    means supporting said sheath and pressure chamber in coaxial relation for movement from a horizontal position to a vertical position with said pressure chamber uppermost.
4. An apparatus as recited in claim 1 with the addition of a frame and a stand supporting said frame for pivotal movement, on a horizontal axis, and wherein said sealing means comprises:

(a) a rigid perforated forming chamber of tubular form having an internal diameter large enough to contain said sheath in its expanded form and being open at one end, defining an outwardly divergent conical seating surface at its open end, and being mounted rigidly on said frame, said sheath being insertable axially into said forming chamber to project outwardly from the open end thereof, (b) means for sealing the opposite end of said sheath, (c) an inwardly tapering tubular ferrule capable of passing said core member therethrough and insertable in the projecting end of said sheath, and cooperating with the conical seating surface of said forming chamber to press said sheath therebetween when said ferrule is moved toward said forming chamber, (d) a rigid tubular pressure chamber mounted on said frame in normally coaxial relationship with said forming chamber and for movement relative to said frame toward said forming chamber, said pressure chamber being of a size to contain said core member and having one open end abutting said ferrule in communicating relation therewith, (e) compressible sealing means between said pressure chamber and said ferrule, and (f) connecting means joining said pressure chamber and said forming chamber to move the former toward the latter whereby to compress the sealing means between said pressure chamber and said ferrule, and to compress said sheath between said ferrule and the seating surface of said forming chamber, said forming and pressure chambers being movable, by reason of the pivoted mounting of said frame on said stand, from a position in which their common axis is horizontal, to a position in which said axis is vertical, with said pressure chamber uppermost.

5. An apparatus as recited in claim 4 wherein said forming and pressure chambers are relatively movable on said frame, transversely to their axes, to a position in which their open ends are exposed, for the insertion therein respectively of said sheath and said core member.

References Cited
UNITED STATES PATENTS

| | | | |
|---|---|---|---|
| 284,050 | 8/1883 | Nichols | 156—156 |
| 1,457,781 | 6/1923 | Loughead | 29—421 X |
| 1,461,130 | 7/1923 | Loughead | 29—450 |
| 2,201,706 | 5/1940 | Sukohl | 29—421 X |
| 2,366,359 | 1/1945 | Searle | 29—450 |
| 1,608,206 | 11/1926 | Freedlander | 29—235 |
| 2,645,004 | 7/1953 | Dorner | 29—148.4 X |

THOMAS H. EAGER, Primary Examiner

U.S. Cl. X.R.

29—148.4 D, 235, 450